Nov. 19, 1929.   H. S. GRAVES   1,736,530
PISTON RING
Filed April 14, 1927
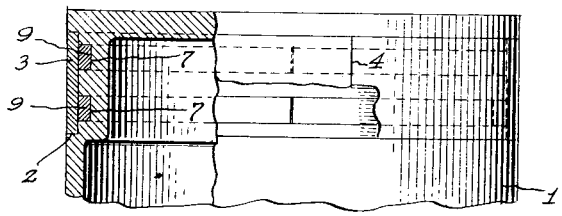
Fig.1.
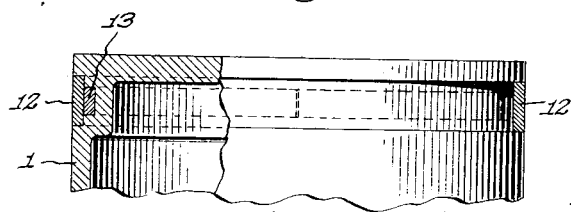
Fig.2.
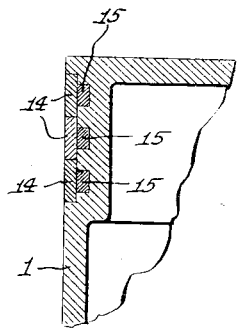
Fig.5
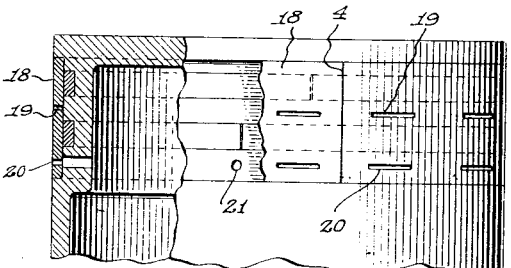
Fig.3.
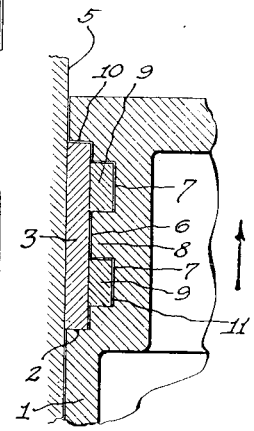
Fig.6.
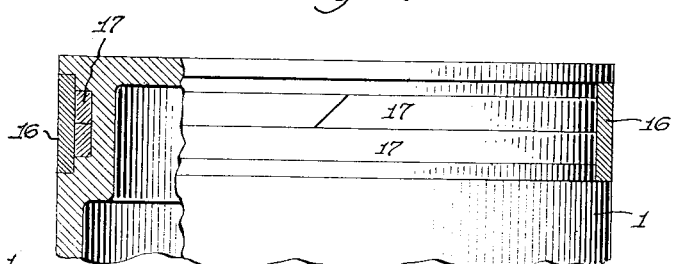
Fig.7.
Fig.4.
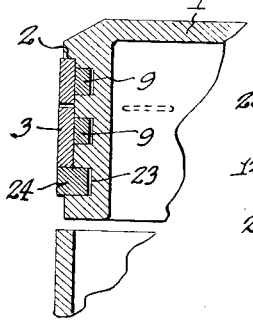
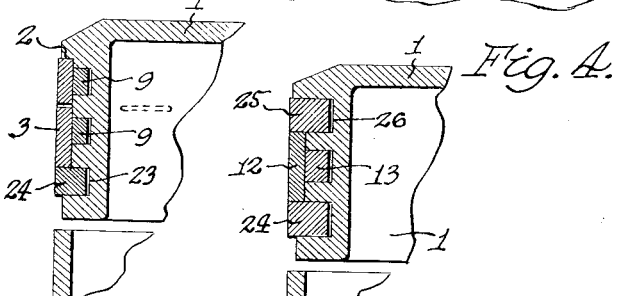
Fig.8.
Inventor
Harry S. Graves,
By
Attorneys Patented Nov. 19, 1929

1,736,530

UNITED STATES PATENT OFFICE

HARRY S. GRAVES, OF HIGHLAND PARK, MICHIGAN

PISTON RING

Application filed April 14, 1927. Serial No. 183,677.

My invention aims to furnish a piston with a compression sealing band backed up by an expansible ring which maintains a constant non-leakable connection between the band and a cylindrical wall, during reciprocation of the piston, and co-operates with the band in providing a barrier between the piston and the cylinder wall to prevent the pumping of oil by the piston and the escape of any compression by the piston.

The invention may take the form of a single band backed up by one or more piston rings or the band may be divided into a multiplicity of parts, each backed by an individual ring. In either instance the rings will cooperate with one another and with grooved walls of the piston in forming a barrier, between the cylinder wall and the piston, against the passage of oil into the combustion chamber or cylinder of an internal combustion engine in connection with which the piston may be used. The arrangement of the bands and rings of the piston is such as to form oil pockets so that the oil may be relied upon for sealing the piston relative to a cylinder wall and thus increase the efficiency of the piston as a means of establishing a high degree of compression for ignition purposes or a high reduction of atmospheric pressure for fuel intake purposes in connection with an engine.

My invention, in its various forms, will be hereinafter specifically described and then claimed, and reference will now be had to the drawing, wherein Figure 1 is a side elevation of a portion of the piston, partly in section, showing a single band and two rings;

Fig. 2 is a similar view showing a band and a single ring;

Fig. 3 is a similar view showing the use of a band and two rings showing oil control slots;

Fig. 4 is a similar view showing another arrangement of a single band and two rings;

Fig. 5 is a detail sectional view of a portion of a piston showing a plurality of bands with a ring associated with each band;

Fig. 6 is an enlarged detail sectional view of a portion of a piston shown in Fig. 1 exaggerating passages that may exist in the piston structure;

Fig. 7 is a similar view showing the use of a bottom supporting ring, and

Fig. 8 is a similar view showing top and bottom supporting rings.

Reference will first be had to Figs. 1 and 6 showing the upper or outer end of a piston 1 which has its wall formed with a wide channel 2 in which is placed a band 3 having a cross section approximating the cross section of the channel 2. This band may be suitably split, as at 4, to facilitate placing the band in the channel 2, also to permit of the band being distended for a snug wiping engagement with a cylinder wall 5. The outer wall or periphery of the band 3 is made true to the wall 5 so that it will have a perfect fit within a cylinder and can intimately contact with the cylinder wall to eliminate any appreciable space between the cylinder wall and the outer wall of the band.

The channel 2 takes the form of a wide groove and the inner or back wall 6 of the channel is provided with spaced apart annular grooves 7. These grooves are set in from the end walls of the channel 2 and being in spaced relation to each other form an annular rib 8, the outer wall of which contributes to the formation of the channel 2 with the end walls of the rib contributing to the formation of the grooves 7.

In the grooves 7 are placed split expansible rings 9 approximating in cross section the cross section of each groove. These rings have the outer walls thereof finished for intimate contact with the inner wall of the band 3, so as to establish the same kind of a non-leakable connection as exists between the outer wall of the band 3 and the cylinder wall 5. The expansible rings 9 serve to distend the band 3 and it is in this manner that a positive non-leakable connection is established between the band walls, the cylinder wall 5 and the outer walls of the rings 9.

In Fig. 6 there is a more or less exaggerated condition of the piston 1 reciprocated for a compression stroke in the direction of the arrow shown. It will be assumed that the piston is reciprocated in a vertical plane so that the grooves 7 may be spoken of as having upper and lower walls. Such reciprocation of the piston in the direction of the arrow causes the rings 9 to snugly engage the lower walls of the grooves 7 and the lower edge of the band 3 to snugly engage the lower wall of the channel 2, the intimate contact being denoted by single lines in Fig. 6. This means that there is no passage under the band 3 and the rings 8 as the same are shifted by the piston. During such movement the intimate contact between the band, cylinder wall and rings 9 is maintained by an expansive force of the rings 9 in a radial direction against said band. As a result of such forces and the movement of the piston 1 there may exist passages between the inner wall of the band 3 and the back wall 6 of the channel 2 and between the upper walls of the band and rings and the upper walls of the channel 2 and the grooves 7. These passages are indicated by double lines and designated 10 and 11.

On the upstroke of the piston compression may enter the passage 10, but it cannot pass between the lower wall of the upper ring 9 and the upper wall of the rib 8. If it did another barrier would be encountered by reason of the lower ring 9 intimately contacting with the lower wall of the lower grooves 7, so here we have two barriers in addition to a third barrier encountered between the lower walls of the band 3 and the channel 2.

Considering a down stroke of the piston by which the band 3 and rings 9 are dragged by the piston, an intimate contact is established between the upper walls of the band 3 and the rings 9 facing the upper walls of the channel 2 and the grooves 7. As a result of this shifting of the band and its backing up rings oil might enter the passage 11 and be trapped therein. If so, the oil constitutes a sealing medium and is carried along with the piston as a closure for the passage 11 so that considering the band 3 and the rings 9 as fulfilling their sealing functions, there is a positive and non-leakable connection between the piston 1 and the cylinder wall 5.

In some types of pistons it may be desirable to use a single band 12 and a single ring 13, as brought out in Fig. 2, and this arrangement may be duplicated, as suggested in Fig. 5, where bands 14 have an edge to edge contact with each band backed up by an individual ring 15. Furthermore, a single band 16 may be backed up by edge-to-edge rings 17, as shown in Fig. 4, and for the purposes of proper lubrication and a release of lubricant pressure, Fig. 3 shows how a band 18 may be provided with a series of circumferentially arranged slots 19 and 20, the slots 20 being disposed relative to openings 21 in the piston wall. These openings will permit of oil pumped by the piston returning to an engine crank case.

In Fig. 7 the inner wall of the channel 2 has another groove 23 for a lower supporting ring 24 on which rest the lower edge of the band 3. An upper ring 25 may be used by providing a groove 26 therefor, whereby the band 3 will be supported in both directions of piston movement. These supporting rings not only afford a very substantial ledge or support for the band, but provide additional sealing contact surfaces. Further, the supporting rings may readily adapt my band and ring construction to a piston head of less diameter than a skirt or body forming part of the piston.

In using the term "band," it is intended to distinguish the same from a sleeve such as used throughout the length of a piston or as a sleeve valve, although the band may be considered as a comparatively short sleeve, its length depending on the number of expansion rings used to maintain cylinder wall contact.

I desire to call particular attention to the arrangement of a split band or sleeve relative to its backing-up expansion rings, which are also of the split type. The split ends of the expansion rings are arranged diametrically opposite the split ends of a band or bands and in this manner I attain a three hundred and sixty degree contact pressure on the band or sleeve and consequently on a cylinder wall. With the split ends of the band and rings in such relation there is a uniform wall pressure on the cylinder and consequently if there is any wear it is uniform throughout the circumference of the contacting piston parts. Other characteristics resulting from the construction herein described may be considered as follows;

Low pressure with a less co-efficient of friction between the cylinder wall and the piston sleeve or band.

Continuous cylinder wall and band pressure contact, as compared to any design where rings only are used.

Maximum oil seal due to the barrier or obstructed passages preventing oil passing to a cylinder head, likewise preventing compression loss.

Applicable to any design of piston and material for the same.

Particularly adapted for high compression engines where super-charges are used.

Adapted to overcome crank case oil dilution due to seepage of gasoline etc., past the piston ring when the engine is cold.

Economy and simplicity of sleeve or band replacement, compared to oil piston rings now in use.

What I claim is:—

1. A piston having a wide channel therein with the back wall of said channel provided with grooves, a band in the channel of said piston, expansible rings in the grooves bearing against the inner wall of said band, another groove in said piston, and a supporting ring in said groove and extending over one edge of said band.

2. A piston having a wide channel therein with the back wall of said channel provided with a groove, a band in the channel portion of said piston, an expansible ring in the groove and bearing against the inner wall of said band, another groove in said piston, and a supporting ring in said groove and extending over one edge of said band.

3. A piston having a wide channel therein with the back wall of said channel provided with a groove, a band in the channel portion of said piston, an expansible ring in the groove and bearing against the inner wall of said band, said channel being deepened and widened at the sides thereof, and supporting rings inserted in said deepened and widened portions and extending over the edges of said band.

In testimony whereof I affix my signature.

HARRY S. GRAVES.